April 28, 1970     W. K. MICHAELIS ET AL     3,509,203

TRANSESTERIFICATION OF DICARBOXYLIC ALKYL ESTERS WITH GLYCOLS

Filed Dec. 16, 1966     2 Sheets-Sheet 1

INVENTORS
WALTER K. MICHAELIS
WOLFGANG A. H. BERNSTORFF
FRITZ R. CH. WIESE
REINHARD K. BÄRMANN
GÜNTER H. K. MAJONEK
GOTTFRIED G. E. K. REICHEL

INVENTORS
WALTER K. MICHAELIS
WOLFGANG A. H. BERNSTORFF
FRITZ R. CH. WIESE
REINHARD K. BARMANN
GUNTER H. K. MAJONEK
GOTTFRIED G. E. K. REICHEL

United States Patent Office 3,509,203
Patented Apr. 28, 1970

3,509,203
TRANSESTERIFICATION OF DICARBOXYLIC
ALKYL ESTERS WITH GLYCOLS
Walter K. Michaelis, Brandenburg, and Wolfgang A. H. Bernstorff, Fritz R. Ch. Wiese, Reinhard K. Bärmann, Günter H. K. Majonek, and Gottfried G. E. K. Reichel, Premnitz, Germany, assignors to VEB Chemiefaserwerk "Friedrich Engels," Premnitz, Kreis Rathenow, Germany
Filed Dec. 16, 1966, Ser. No. 602,352
Int. Cl. B01j 9/00; C07c 69/82
U.S. Cl. 260—475  11 Claims

ABSTRACT OF THE DISCLOSURE

Apparatus for the continuous transesterification of dicarboxylic acid alkyl esters with at least one glycol comprising a plurality of bottoms in cascade arrangement, means for downward travel of the liquid, inlet means for admission of the liquid to the uppermost bottom, a plurality of concentric annular passages in each bottom for horizontal flow of the liquid, a plurality of weirs in each annular passage for breaking the flow, an overflow weir in each annular passage for directing the liquid from the outermost to the adjacent interior passage and from there to the center passage, a dividing wall whereby the temperature in the reaction liquid is equalized, outlet means at the top for the vapors and means for collecting the diglycol ester at the bottom. The apparatus prevents the reaction mixture from becoming enriched with the vapors of the byproduct. The process is conducted as a multistage operation. The weirs act as flow-breakers and the continuous change of direction gives conditions essentially analogous to an ideal flow tube.

---

The present invention relates to a process and an apparatus for the continuous transesterification of alkyl esters of dicarboxylic acids and/or mixtures of dicarboxylic esters wtih glycols or mixtures of glycols, whereby diglycol esters are obtained.

It is known that a continuous production of diglycol esters can be accomplished in a conventional fractionating column by feeding into the column glycol, alkyl esters of dicarboxylic acids and certain catalysts. It is further known that the bottoms of such columns are provided with inserts, for instance, bell-shaped structures, which effect a thorough intermingling and stirring of the reaction liquid on said bottoms by means of alcoholic vapors which rise from the lower bottoms to the upper ones. Heating is effected from the sump of the columns, so that the rising vapors transmit heat by condensation to the liquid reaction mixture on the bottoms.

It is further known that the continuous transesterification can be carried out in a cascade formed by several bottoms, the mixing of the reaction mixtures being performed on the bottoms by a current of inert gas or by mechanical stirrers.

In another known method, apparatuses are used for the reaction which have several adjacent chambers provided with weirs and being heated by independent heating means.

When the transesterification is carried out continuously in a fractionating column with structural inserts, such as bells, in which an exchange of materials and of heat occurs between reaction liquid and vapor in countercurrent, the alcohol formed in the reaction will accumulate in the rising vapors to an increasing extent. Thus the liquid fed into the reaction will come into contact with vapors having a high alcohol content, more particularly in the upper part of the column, that is, the first stage of the reaction. By the equilibrium which will be established between reaction liquid and vapor, the former, too, will become enriched in alcohol, a fact that will tend to decrease the rate of the reaction. Although it is possible to counteract this shortcoming to a certain extent by feeding larger amounts of glycol with the reaction mixture, this will entail a greater expenditure in heating energy. It is another disadvantage of the process here discussed that by the alcohol concentration increasing in the reaction liquid, its boiling point will be lowered. Since the velocity of the reaction depends largely on the temperature, this drop in temperature will cause a decrease in yield per time unit.

It is a further drawback of the known process using fractionating columns with structural inserts, such as bells, that an undesirable remixing of the reaction liquid with the incoming liquid will be brought about, by which the time of dwell will be increased, and the volume of the apparatus will not be properly utilized.

In the conventional arrangement of wide overflow weirs at the bottoms of a fractionating column or a cascade, a uniform dwell time of all particles of the reaction mixtures will only be possible when larger amounts of the reaction liquid are passed over the bottom. When currents of small volume are passed through, such as are necessary for a high space-time output, only small amounts of reaction liquid will be passed over the weirs. In that case, the reaction liquid has the tendency to flow over the bottom in preferred paths, so that dead water spaces will form in other areas. Such channel formation will lead to a marked dwell time increase, regardless of the effect of the bells.

It is another shortcoming of the transesterification carried out on the bottoms of a cascade that the drive of the stirrers requires additional energy, or that special devices have to be provided for the admission of the inert gas. In both cases, a remixing of the reaction liquid will likewise occur.

As to the use of a horizontally disposed, multiple-chamber apparatus for carrying out the reaction, each chamber having a weir therein for the passage of liquid thereover, this device has the drawback that due to comparatively wide weirs the level of the liquid above the edge of the weir is small so that there will be, again, the tendency of forming certain flow channels and thus the creation of dead water areas.

It is the object of the present invention to provide a process for the continuous transesterification of alkyl esters of dicarboxylic acids with glycols with formation of diglycol esters, in which the drawbacks of the known methods are eliminated, more particularly the drawbacks caused by the enrichment of the reaction liquid in alcohol received from the vapors rising from lower levels of the fractionating columns, where such columns are used.

It is another object of the invention to provide a process in which the stirring of the reaction mixture by means of vapors, inert gas, or mechanical means can be dispensed with.

It is yet another object to provide a process which will exclude the undesirable increase in the dwell time of the reaction mixture in the apparatus.

It is a further object to provide an apparatus which makes it possible to carry out the process according to the invention in simple and inexpensive manner.

Other objects and advantages of the present invention will become apparent from the detailed description and the annexed drawings.

The process according to the invention is likewise based on the use of a cascade system composed of several bottoms or groups of bottoms. According to the invention a mixture consisting for instance of dicarboxylic esters and glycols, as well as a catalyst dissolved in glycols, is fed to the bottoms from the top and allowed to pass over the bottoms in narrow flow channels. From the bottoms, which are heated from below, by means of a heating agent, preferably an organic compound, the alcohol formed during the reaction is evaporated together with part of the glycol. By means of the rising vapor bubbles thus generated a local intermingling of the liquid layer will occur, so that dead water areas will not form. Moreover, layer formation in the reaction liquid, as a consequence of varying flow velocities, are thus avoided. The mixture of vapors separated from the reaction liquid is carried off by a shaft arranged in the center of the cascade, so that there will be no intimate contact between the reaction liquid and the vapor mixture, in which alcohol vapor becomes concentrated which is formed during the transesterification. Subsequently, glycol is separated from the vapor mixture, in known manner, for instance, by fractionation, and may be then used once more.

If a cascade is used which comprises several bottoms, the transesterification will be carried out at a constant temperature. When cascades are used whose bottoms are combined and heated in groups, the transesterification can be effected in several stages at different temperatures. By use of lower temperatures at the start of the reaction, strong evaporation, for instance, of dimethylterephthalate is prevented, and so is its sublimation in apparatus arranged in series with the cascade.

By raising the temperature toward the end of the process, not only the prompt removal of the alcohol formed in the reaction, e.g. methanol, is achieved, but also a more rapid reaction will occur due to the increased reaction rate. In carrying out the reaction in the last-mentioned manner it has proved advantageous to remove separately the mixture of vapors generated in each group of bottoms. The control of the temperatures in each group of bottoms permits to a large extent production of an even product free of glycol.

For carrying out the process, according to the invention, narrow annular channels connected by overflow weirs, are arranged on the bottoms of the cascade, the width of the channels with respect to their depth being smaller than 1.5:1. After passing through the curved path of one channel, the reaction liquid is directed over an overflow weir into the next channel with simultaneous change in direction; after having passed through all the channels of one level, the reaction liquid flows down to the next lower bottom. Due to the shape of the channels and the type of heating, a flow pattern is achieved which comes close to the one in an ideal flow tube. The flow is very similar to the properties of a plug flow, in which all particles of the liquid have the same dwell time. In the channels, weirs may be placed transverse to the direction of flow which act as flow breakers. Due to the fact that the reaction liquid is made to pass over and under those structures, a layer formation of temperature is likewise avoided.

In a sump, which is disposed below one of the bottoms or bottom groups, and which has preferably a cone-shaped bottom, a further equalization of the transesterified product is accomplished.

As compared to the known processes operating with bottoms arranged in a cascade, the present process has the advantage of realizing the conditions of a plug flow, the remixing of the reaction liquid and formation of dead water areas being avoided to a large extent.

Furthermore, the maintenance of a constant, optimum temperature in the cascade or in every stage of the cascade is guaranteed. All this spells short reaction times and, thereby, an optimum utilization of the apparatus.

In the accompanying drawings two embodiments of an apparatus according to the invention are shown by way of example, but it should be understood that these are given by way of illustration and not limitation. Many modifications in the details can be made without departing from the spirit of the invention.

Figure 1:
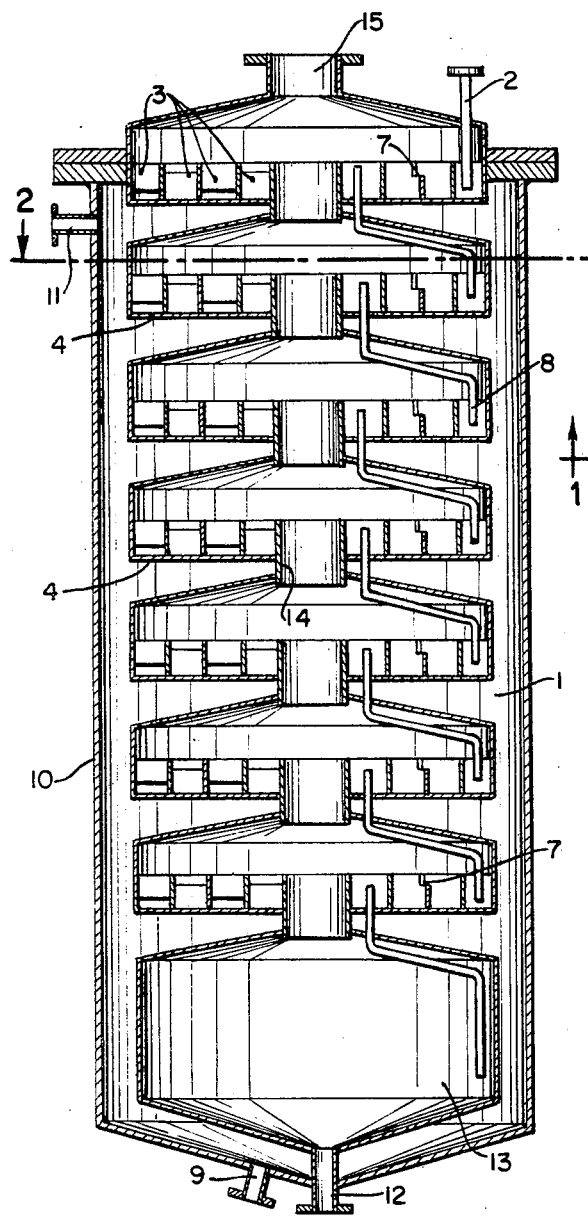
FIG. 1 is a longitudinal section through a multiple-bottom cascade arrangement according to the invention.
Figure 2:
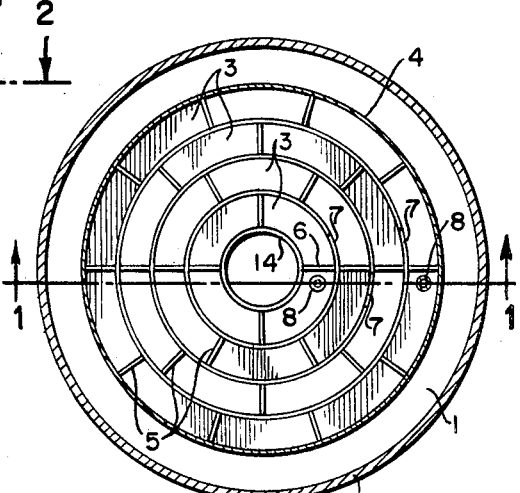
FIG. 2 is a cross section through FIG. 1 along line 2—2.
Figure 3:
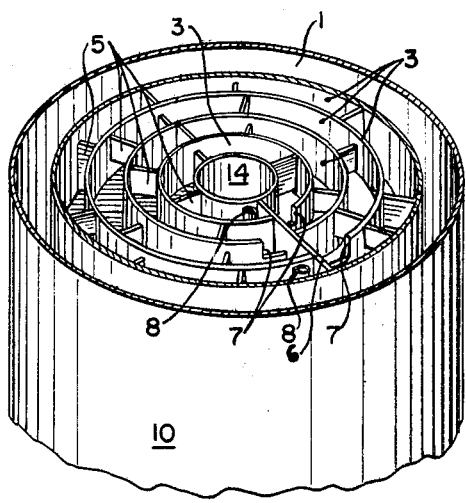
FIG. 3 is a perspective view of one bottom showing the concentric channels.

Referring first to FIGS. 1, 2 and 3, a cascade arrangement is generally designated by 1 wherein a plurality of closed bottoms 4 are disposed above each other on a central hollow shaft 14. Each bottom 4 contains a number of concentric annular channels 3, in which overflow weirs 5 are disposed as flow breakers. In the topmost bottom 4, an admission pipe 2 is provided for the reaction liquid in the peripheral channel 3. Furthermore, each bottom has disposed therein in the innermost circular channel 3 an overflow pipe 8 leading to the next bottom below for conveying the reaction liquid from bottom to bottom. A dividing wall 6 is provided for directing the reaction liquid to the next channel with change of flow direction as soon as the liquid has completed a passage through an annular channel and arrives at said wall. Overflow weirs 7 are likewise arranged to assist in the flow directing of the reaction liquid.

A heating jacket surrounding the cascade is designated by 10 comprising an admission pipe 9 for heating medium—mostly an organic compound—and a discharge pipe 11 for the same. A sump 13 is disposed below the last bottom where the reaction product is collected and from which it is discharged by a pipe 12. At the top of the hollow shaft 14 the vapors are allowed to escape through a pipe 15.

Figure 4:
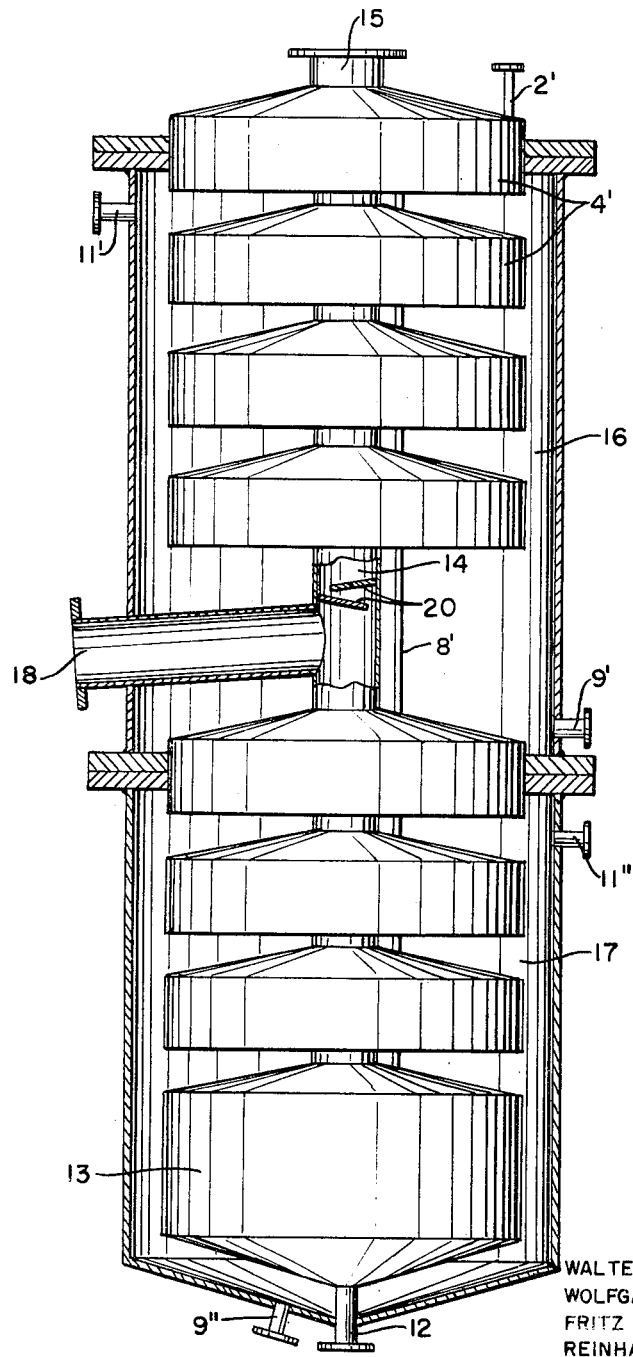
FIG. 4 is a longitudinal section through another embodiment of a cascade arrangement according to the invention, comprising two groups of bottoms.

FIG. 4 is a cascade arrangement with two groups of bottoms, the upper group being designated by 16, the lower by 17. The bottoms are similarly designed to the ones of FIG. 1 and a detailed description of the same can therefore be dispensed with. One principal difference between the component parts of the apparatus according to FIG. 4, as compared to the one according to FIGS. 1 to 3, is that separate heating means are provided for the top and bottom part of the apparatus. In the embodiment shown in FIG. 4, the upper bottoms 16 and the lower bottoms 17 can be heated independently of each other. For that purpose, an admission pipe 9' is provided for the heating compound of the upper cascade and a discharge pipe 11' for permitting the escape of said heating agent. The corresponding pipes for the lower cascade are 9" and 11". Furthermore, valve means 20 are provided at tht bottom of the top portion of hollow shaft 14, which permits closing of the shaft at that point and discharge of the vapors by means of a pipe 18 provided for that purpose.

The process of the invention will now be more fully described by a number of specific examples; of these, Examples 1–4 are carried out in the apparatus described in FIGS. 1 to 3, while Example 5 is carried out by the embodiment of the apparatus illustrated in FIG. 4. All percentages are given by weight.

EXAMPLE 1

A solution was prepared by heating and stirring together dimethylterephthalate and ethylene glycol in molar ratio 1:2.3 and addition of a known catalyst dissolved in the ethylene glycol, the catalyst may, e.g., consist of manganous acetate, cobalt acetate. The solution was fed through pipe 2 into the outermost annular channel 3 to the top bottom 4 of cascade 1. The temperature was maintained at the constant level of 195° C. by passage of a heating agent through jacket 10. After the liquid has travelled in the manner above described through all the annular channels of each bottom 4, it leaves the apparatus at 12 in a completely transesterified condition. Colorimetric determination showed that 95% of the reaction liquid fed into the cascade had passed through the bottoms within 3¼ to 3¾ hours. The mean dwell time was therefore 200 minutes. The condensate of the vapor mixture formed during the reaction and withdrawn at the head 15 of shaft 14 contained 92% of methanol, 7.3% ethylene glycol, and 0.7% water.

EXAMPLE 2

Adipic acid diethylester and butanediol-1,4 were dissolved in the molar ratio 1:2.5 with stirring and heating, and thereafter transesterified as described in Example 1. The final product obtained after 3½ hours was transesterified by 93%. The condensate withdrawn consisted of 86% ethanol, 12.8% butanediol-1,4, and 1.2% water.

EXAMPLE 3

A mixture of 90% dimethylterephthalate and 10% of the potassium salt of 5-sulfo-isophthalic dimethylester were dissolved in ethylene glycol in the molar ratio 1:2.3 and transesterified as in Example 1. Transesterification was completed in about 4 hours to 96%. The condensate of the vapors withdrawn consisted of 91% by weight of methanol, 8.2% ethylene glycol, and 0.8% water.

EXAMPLE 4

Dimethylterephthalate and a mixture of 80% by weight of 1,4-cyclohexane dimethylol and 20% ethylene glycol were mixed with stirring and heating in the molar ratio 1:2.8 and then transesterified as described in Example 1. Within 4 hours, transesterification is complete (100%). The condensate of the vapors withdrawn consisted of 93% methanol, 2.8% 1,4-cyclohexane-dimethylol, 3.4% ethylene glycol and 0.8% water.

EXAMPLE 5

In a cascade arrangement as illustrated in FIG. 4, a reaction liquid as prepared for Example 1, is admitted by pipe 2' to the uppermost bottom 4' of group 16. The reaction liquid is heated up to the boiling point of ethylene glycol, 197° C., while passing over the bottom of group 16.

While the liquid continues its downward flow, after having passed through pipe 8' into the lower cascade portion with a separately heated group of bottoms, it is heated up to 240° C. The passage of the liquid through the entire apparatus takes about 4 hours. The reaction mixture leaving the bottom of the apparatus at 12 consists of diglycol terephthalate and oligomers of the same; it has a solution relative viscosity of 1.08. The condensate of the vapor mixture withdrawn from the head of the apparatus at 15 consists of 81% methanol, 18.4% ethylene glycol, and 0.0% water. When the vapors are withdrawn both at the pipe 18 and the top 15 the condensate has the following composition: 42% methanol, 57.6% ethylene glycol and 0.4% water; 4% methanol, 92% ethylene glycol, 0.1% water and 3.9% diethylene glycol.

What is claimed is:

1. A process for the continuous transesterification of dicarboxylic alkyl esters or mixtures of such esters with at least one glycol in the presence of catalysts dissolved in said glycol for obtaining diglycol esters therefrom which comprises passing the mixture of reactants over a plurality of substantially horizontal structures in cascade arrangement, the mixture being conveyed through a number of annular paths with repeatedly changed directions in each of said structures, while being heated to reaction temperature from below, finally withdrawing said transesterified reaction liquid from the bottom of the cascade, while passing the vapors generated in the reaction to the top of the cascade without the vapors contacting liquid at the higher levels, the rising vapor generating a local intermingling of the said reaction liquid and withdrawing the vapors from the top of the cascade.

2. The process according to claim 1, wherein the transesterification is carried out as a single-stage operation at constant temperature.

3. The process according to claim 1, wherein the transesterification is carried out as a multiple-stage operation at a different temperature in each stage.

4. An apparatus for the continuous transesterification of dicarboxylic alkyl esters or mixtures of such esters with at least one glycol, in the presence of catalysts dissolved in said glycol for obtaining diglycol esters and a lower boiling alcohol therefrom, comprising a plurality of bottoms disposed in cascade arrangement above each other for downward travel of the reaction liquid therethrough, inlet pipe means for admission of the reaction liquid to the uppermost bottom, a plurality of concentric annular passages in each bottom for horizontal flow of said liquid therethrough, a plurality of weirs in each annular passage for breaking the flow, an overflow weir arranged in each annular passage for directing the liquid from the outermost to the adjacent interior passage and from there to the center passage with reversal of flow direction between adjacent passages a dividing wall whereby the temperature in said reaction liquid is equalized, a connecting tube from the center of each to the peripheral passage of the bottom therebelow, for permitting the downward travel of the reaction liquid through the cascade arrangement, means for conducting the vapors of the alcohol to the top of the cascade without contacting the the liquid above, outlet means at the top for the vapors of the lower boiling alcohol and means for collecting the diglycol ester at the bottom.

5. The apparatus according to claim 4, comprising further a heating means surrounding the plurality of bottoms, and means for admission of a heating agent at the bottom and for withdrawal of said agent at the top of said heating means.

6. The apparatus according to claim 4, wherein said means for conducting the vapors of the alcohol are a central hollow shaft, with an opening in the bottom of said shaft for receiving said vapors and a discharge pipe for the same at the top.

7. The apparatus according to claim 6, wherein said shaft serves as a mounting means for said bottoms.

8. The apparatus according to claim 6, comprising a sump arranged in series with the lowermost bottom, and discharge means in said sump for removal of the reaction liquid therefrom.

9. The apparatus according to claim 6, wherein a second discharge pipe is provided approximately halfway down the shaft for escape of vapors, and associated therewith valve means mounted within said shaft above said discharge pipe in the proximity thereof, said second discharge pipe and said valve means being provided to render the apparatus operable as a two-stage device.

10. The apparatus according to claim 9, wherein one heating jacket is provided for the upper portion of said apparatus and another heating jacket for the lower portion of the apparatus whereby different temperatures can be maintained in said portions.

11. The apparatus according to claim 4, wherein the ratio between the width of said annular passages and the depth thereof is smaller than 1.5:1.

References Cited

UNITED STATES PATENTS

| | | | |
|---|---|---|---|
| 1,981,346 | 11/1934 | Florey | 261—114 |
| 2,716,024 | 8/1955 | Dice | 261—114 X |
| 2,832,674 | 4/1958 | Ramzenberger | 23—285 |
| 3,162,700 | 12/1964 | Irons | 261—114 |
| 3,250,747 | 5/1966 | Mitchell et al. | 23—285 X |

JOSEPH SCOVRONEK, Primary Examiner

U.S. Cl. X.R.

23—283, 285, 288; 260—485; 261—114